United States Patent
Lai et al.

(10) Patent No.: US 11,475,750 B2
(45) Date of Patent: Oct. 18, 2022

(54) SYSTEMS AND METHODS FOR FIRE ALARM NOTIFICATION IN VIRTUAL REALITY ENVIRONMENTS

(71) Applicant: MassVR, LLC, Skokie, IL (US)

(72) Inventors: Chris Lai, Northbrook, IL (US); Steven Daniels, Chicago, IL (US)

(73) Assignee: MassVR, LLC, Skokie, IL (US)

( * ) Notice: Subject to any disclaimer, the term of this patent is extended or adjusted under 35 U.S.C. 154(b) by 0 days.

(21) Appl. No.: 17/396,413

(22) Filed: Aug. 6, 2021

(65) Prior Publication Data
US 2022/0044537 A1 Feb. 10, 2022

Related U.S. Application Data

(60) Provisional application No. 63/062,170, filed on Aug. 6, 2020.

(51) Int. Cl.
| | |
|---|---|
| *G08B 17/10* | (2006.01) |
| *G08B 25/00* | (2006.01) |
| *G08B 21/02* | (2006.01) |
| *G08B 7/06* | (2006.01) |
| *G06T 19/00* | (2011.01) |
| *G08B 25/14* | (2006.01) |
| *G06F 3/01* | (2006.01) |

(52) U.S. Cl.
CPC ............. *G08B 17/10* (2013.01); *G06F 3/011* (2013.01); *G06T 19/006* (2013.01); *G08B 7/06* (2013.01); *G08B 21/02* (2013.01); *G08B 25/008* (2013.01); *G08B 25/14* (2013.01)

(58) Field of Classification Search
CPC ...... G08B 17/10; G08B 21/02; G08B 25/008; G08B 25/14; G06T 19/006; G06F 3/011
See application file for complete search history.

(56) References Cited

U.S. PATENT DOCUMENTS

| | | | | |
|---|---|---|---|---|
| 9,990,778 | B2 * | 6/2018 | Long | G08B 13/19684 |
| 10,380,875 | B1 * | 8/2019 | Roberts | G08B 7/06 |
| 10,431,060 | B2 * | 10/2019 | Saidi | G06F 1/163 |
| 10,607,367 | B2 * | 3/2020 | Keen | A63F 13/215 |
| 10,832,547 | B2 * | 11/2020 | Tokuchi | E04H 1/125 |
| 10,841,534 | B2 * | 11/2020 | Kaufthal | G02B 27/017 |
| 10,896,599 | B1 * | 1/2021 | Roberts | G06F 3/011 |
| 11,302,027 | B2 * | 4/2022 | Keen | G06F 3/012 |

* cited by examiner

*Primary Examiner* — John A Tweel, Jr.
(74) *Attorney, Agent, or Firm* — K&L Gates LLP

(57) ABSTRACT

An alert system for alerting a user in a virtual reality environment is provided. The virtual reality environment has a corresponding physical environment that is monitored by a detector of a fire alarm system through an alarm panel, and the virtual reality environment is provided to one or more user virtual reality devices by a central server. The alert system includes a processor in communication with the alarm panel of the fire alarm system and the central server of the virtual reality system and a memory. The processor continuously monitors the alarm panel of the fire alarm system, receives a signal from the alarm panel when an alarm of the detector has been triggered, and disconnects the one or more user virtual reality devices from the central server upon receipt of the signal.

16 Claims, 2 Drawing Sheets

SYSTEMS AND METHODS FOR FIRE ALARM NOTIFICATION IN VIRTUAL REALITY ENVIRONMENTS

CROSS-REFERENCE TO PRIOR FILED APPLICATIONS

This application incorporates by reference and claims the benefit of priority to U.S. Provisional Application No. 63/062,170 filed on Aug. 6, 2020.

BACKGROUND OF THE INVENTION

The present subject matter relates generally to systems and methods for notifying users in a virtual reality environment of a fire alarm activation. More specifically, the present invention relates to systems and methods of interrupting a virtual reality environment in order to alert virtual reality users that a fire alarm has been activated.

Virtual reality (VR) systems are digitally rendered environments in which users immerse themselves in a virtual experience. These environments can be modeled after real or imaginary locations. Current technology allows users to explore these environments using a head-mounted display (HMD), often in conjunction with other equipment such as handheld controllers or movement-tracking clothing. HMDs display a virtual environment in front of the user's eyes. The HMDs can take a variety of forms, such as glasses, goggles, helmets etc. Some systems allow users to explore the virtual world by moving through their physical environment, such movement corresponding to and controlling movement in the virtual world. These real and virtual movements are usually limited in scope and range by the environment in which the user is physically located and by the virtual environment the user is exploring.

While a user is immersed in a virtual reality system, the user's HMD typically prevents the user from seeing his or her physical surroundings; this is a tautological requirement of an immersive virtual experience.

One obstacle that VR systems face is difficulty in notifying the user immersed in the VR experience of problems that have arisen in the physical space. Virtual reality environments are routinely programmed to alert the user to an impending collision as the user approaches a stationary structure or another virtual reality player in the associated physical space. Ideally, the virtual reality system alerts the user to the impending collision without fully disrupting the virtual reality user's game in order to maintain the user's immersive virtual experience.

In more urgent situations, the difficulty is exacerbated when an emergency arises in the physical space that requires the user to break from the VR environment. In VR environments, systems involve layers of communication between multiple processors and other hardware components. Collision avoidance systems may operate on various levels of the software in order to maintain the immersive experience, but emergencies such as a fire alarm must instantaneously interrupt the user's immersive virtual reality experience.

Some conventional virtual reality systems rely on operators and personnel who monitor the physical environment and interrupt the virtual reality system in order to alert users to the emergency. This human dependency introduces a weakness at which a significant mistake could occur. The operator may not become immediately aware of the fire or may have difficulty disconnecting the server from the user devices within the virtual reality system. Even a few moments of delay could result in significant harm to the users.

Other systems may include a fire alarm notification within the programming of the virtual reality system itself. In this case, the VR software detects the triggering of a fire alarm and displays an alert to the users instructing them to remove their VR devices when a fire alarm is triggered without disconnecting the virtual reality environment in its entirety. By including the alert within the existing VR system, the VR system may have faulty programming that, for example, fails to detect the triggered alarm or delays or prevents the display of the notification on the user devices.

Accordingly, there is a need for systems and methods that immediately and reliably disrupt the users' virtual reality experience and alert the user to the fire alarm.

BRIEF SUMMARY OF THE INVENTION

To meet the needs described above and others, the present disclosure provides virtual reality (VR) alert systems and methods for alerting users immersed in a virtual reality environment to an urgent situation, such as a fire in the user's physical environment, that requires a disconnection or break from the VR environment. The VR alert systems and methods are implemented through a connection between the virtual reality system and the fire alarm system of the corresponding physical space and the immediate disconnection of the user virtual reality devices from the server when a fire alarm is triggered.

In one embodiment, the VR alert system operates separate and apart from the virtual reality system that provides the VR environment in which users are immersed. By providing a VR alert system that is separate from the VR system, the VR system can be fully disconnected while the alert system continues to monitor the physical space while also reliably and immediately releasing the users from the VR environment.

For purposes of this disclosure, VR systems are understood to be a combination of one or more devices through which a VR environment may be displayed to users and with which the users may explore and interact. The devices used within the VR system may include, but are not limited to, head-mounted displays (HMDs), wearable computing systems, server or cloud-based computing systems, tracking systems (e.g., laser based, camera based, etc.), motion controllers, handheld controllers, and any other such device that aids in user tracking and virtual immersion, as will be recognized by one having ordinary skill in the art with respect to the subject matter presented herein. VR environments include a central server which generates the virtual reality environment experienced by each individual user and communicates the respective VR environment to the respective user through a user virtual reality device.

VR environments are constructed to match or be based on a model of the physical environment in which the user is located when interacting with the VR environment (dimensions, elevations, etc.). The physical environment is preferably a large, open space in which users move easily. The design of the VR environment reflects the physical obstructions within the physical environment, including the outer perimeter of the space, any structural support members such as columns, walls, or doorways. In many VR systems, operators of the VR system may monitor the functioning of the equipment as users are engaged in the VR environment in order to ensure that the users' experiences are seamless and collision-free.

The VR environment is also designed to increase the immersivity of the experience, which requires that the users are able to disregard the reality of the physical space in which they are playing. When users are engaging in the virtual reality environment, they largely are unaware of their positioning relative to other users and other obstacles within the physical space. Similarly, users engaged in the VR environment are unaware of any other issues unrelated to the VR game that may arise in the physical space.

In addition to the VR environment, the physical space may also be closely monitored. In many spaces, the atmospheric conditions of the physical environment are monitored by a fire alarm system. The fire alarm system may include a variety of detectors such as smoke detectors, carbon monoxide detectors, and heat detectors. Each detector communicates a signal to a fire panel or main control unit, where the user sets settings and limits for each detector. Each detector continually monitors a specific aspect of the atmospheric conditions and an alarm is triggered when the atmospheric condition is in exceedance of the set limit. The fire panel also includes one or more sounder and/or light circuits that sound and/or flash, respectively, when the alarm is triggered.

In addition to detecting signals from a fire panel, the VR alert system can also be set to monitor audio and visual alarms throughout the physical space. The VR alert system may be programmed to monitor the microphones in each of the user head-mounted devices to detect auditory alarms. A setup of cameras throughout the physical space can visually monitor to detect the strobing of emergency lights. When a processor receives a signal from any method of alarm, including the fire panel, the auditory system monitoring HMD microphones, and the visual system monitoring emergency lights, the VR alert system alerts users by sending a signal to the game server. In some embodiments, the processor must receive verification from a combination of methods that an alarm on the fire panel is not active.

In one embodiment of the present application, the VR alert system includes a processor that is in communication with the central server and is hardwired to the fire panel of the fire alarm system. A memory in communication with the processor stores program instructions that, when executed by the processor, cause the processor to monitor the fire panel of the fire alarm system and, when an alarm on the final panel is triggered, disconnect the user virtual reality devices from the central server. The program instructions may be software or firmware.

Once the user virtual reality devices are disconnected from the central server, a default message is immediately displayed on the user virtual reality devices. In one embodiment, the message is simply text that appears on the screen of the user virtual reality device, instructing the user to remove the virtual reality device. The alert system may also use audio (e.g., cautionary announcements or warning sounds) and/or physical cues (e.g., vibration in the HMD, an associated wearable, or other object associated with the user, such as a handheld tool). The alerts may be variable in intensity (e.g., increasing intensity as the level of urgency of the issue increases) or may be simply binary (i.e., on/off). In addition, the alerts may be positioned within space to identify the direction of the danger. For example, an image, sound, or vibration to the user's left may indicate the danger is to the user's left.

In one example, users are immersed in a virtual reality environment when a fire breaks out in the users' physical space. Under normal conditions, users engaged in the VR environment may be unable to hear or see the sounding and flashing of the fire alarm system. Within the VR alert system, the processor continually monitors the fire alarm panel of the fire alarm system. The panel includes a switch that remains open when the detectors of the fire alarm system have not detected any exceedances triggering an alarm. When a detector detects an exceedance of a monitored atmospheric condition within the physical environment corresponding to the virtual reality environment, an alarm is triggered. The switch on the panel closes, causing the panel to send a signal to the processor of the alert system.

When the processor receives the signal from the fire alarm panel, the processor then disconnects the user virtual reality devices from the central server. This disconnection causes the central server to stop generating and displaying the virtual reality environment for each individual user on each user's virtual reality device. A default message then appears on each virtual reality device, indicating that the fire alarm is sounding and instructing the user to remove their virtual reality device and find the nearest exit. In some examples, the message may range in level of urgency that reflects the urgency of the situation.

In one example, an alert system for alerting a user in a virtual reality environment is provided. The virtual reality environment has a corresponding physical environment that is monitored by a detector of a fire alarm system through an alarm panel, and the virtual reality environment is provided to one or more user virtual reality devices by a central server. The alert system includes a processor in communication with the alarm panel of the fire alarm system and the central server of the virtual reality system and a memory in communication with the processor. The memory stores program instructions that, when executed by the processor, cause the processor to continuously monitor the alarm panel of the fire alarm system, receive a signal from the alarm panel when an alarm of the detector has been triggered, and disconnect the one or more user virtual reality devices from the central server upon receipt of the signal.

In another example, the alert system of the present application is in communication with a fire panel of a fire alarm system, and includes one or more user virtual reality devices, a central server providing a virtual reality environment to each user virtual reality device, a processor in communication with the fire panel of the fire alarm system and the server of the virtual reality system, and a memory in communication with the processor. The processor is configured to continuously receive a signal from the fire panel of the fire alarm system, the signal including an indication of whether an alarm has been triggered. When the signal indicates that an alarm has been triggered, the processor disconnects the one or more user virtual reality devices from the central server.

The alert may be visual, audible, tactile, or other. Visual alerts may be text based, avatar-based, a combination of both, or other. An example of a tactile alert is a vibration-based alert. For example, a vibration may be provided through a head-mounted display. The virtual reality devices may be head-mounted displays or other similar devices.

In the primary embodiment, the default message appears once a fire alarm is triggered. The message appears as a result of the broken communication, and includes straight-forward instructions to remove the virtual reality devices and move toward the nearest exit. The message may be stored and contained locally.

In alternative embodiments, the alert may include lights that indicate a direction in which the triggered detector of the fire alarm system is located. The lights may vary in intensity and/or color to signal the urgency of the alarm. For example, the warning at the lowest level of risk may include a single green light signaling at a relatively low intensity outside of the VR display. As the risk increases, the color may shift from green to yellow and the intensity may increase, either by increasing the output of the LEDs or by increasing the number of active LEDs. Then, as the atmospheric conditions reach critical danger levels, the color may shift from yellow to red and the intensity may increase further. These functions can be performed by multiple single-color LEDs or by one or more multicolor LEDs, as will be recognized by those skilled in the art based on the descriptions herein. Further, the increasing risk may be signaled with a single color by varying intensity or by multiple colors with a stable intensity. In other examples, increasing risk may be signaled by an increasing rate of flashing of one or more LEDs. Any visual signaling mechanism that utilizes the space within the HMD that is outside of the VR display and within the user's field of vision may be used for the collision alert system.

An object of the invention is to provide a reliable and immediate notification to users in a virtual reality environment of a dangerous condition within the corresponding physical space.

Another object of the invention is to provide a solution for disconnecting the virtual reality environment within each user's device that is not dependent on a wireless network and/or a human.

Another object of the invention is to promote a greater sense of security to the user to foster the user's ability to immerse himself or herself in the VR experience.

Additional objects, advantages, and novel features of the solutions provided herein will be recognized by those skilled in the art based on the following detail description and claims, as well as the accompanying drawings, and/or may be learned by production or operation of the examples provided herein.

BRIEF DESCRIPTION OF THE DRAWINGS

The figures depict one or more embodiments of the subject matter described herein. They are provided as examples only. Within the figures, reference numbers are used to refer to elements described in the detailed description.

DETAILED DESCRIPTION OF THE INVENTION

Figure 1:
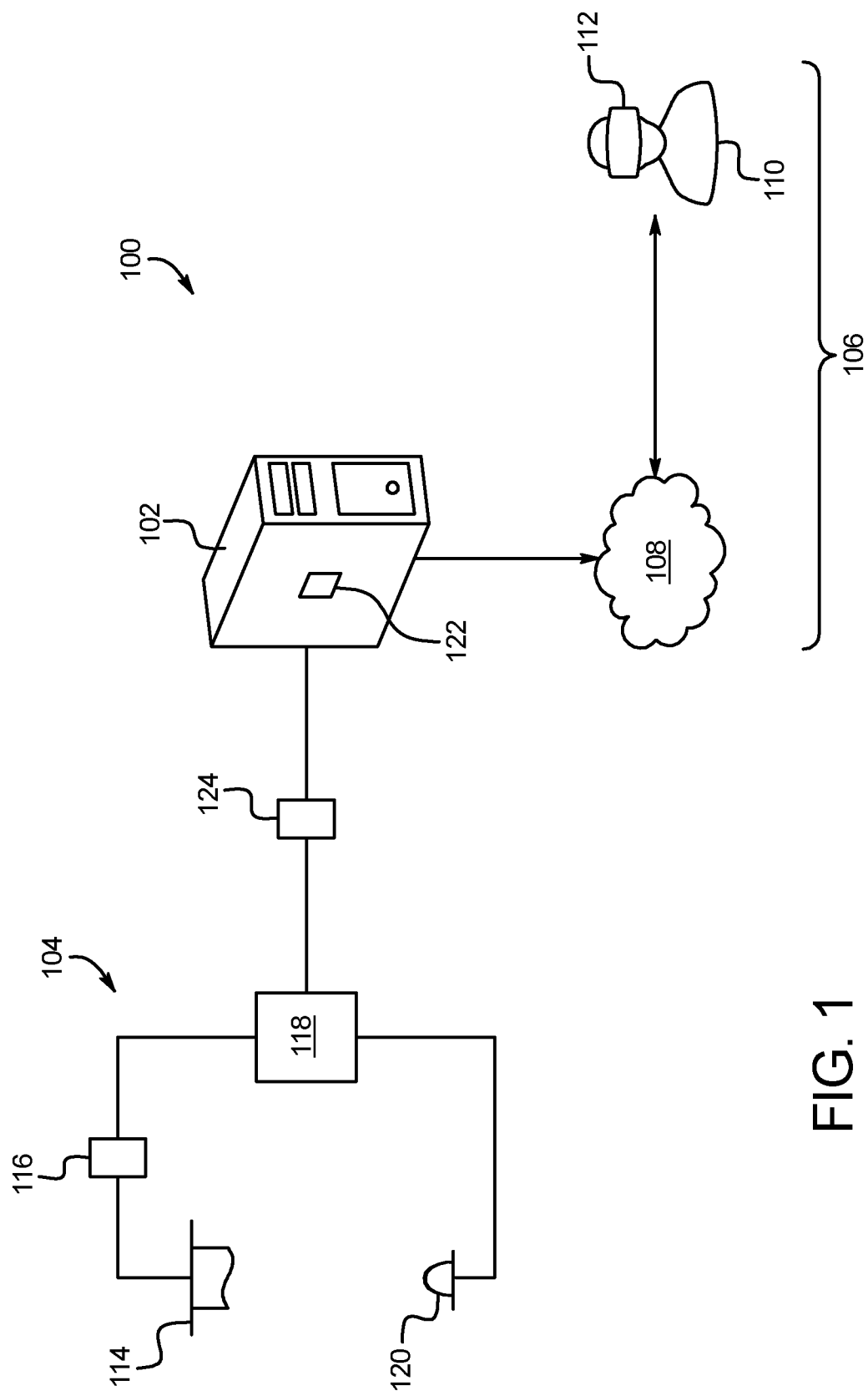
FIG. 1 is a schematic diagram illustrating examples of components of a system for alerting users in a virtual reality environment.

FIG. 1 illustrates an alert system 100 for alerting users in a virtual reality environment of fire or other danger within the corresponding physical space. The alert system 100 reliably interrupts users' virtual reality environments upon the triggering of an alarm because the system 100 utilizes a processor 102 hardwired and dedicated to the fire alarm system 104 and in communication with a central server 108 of the VR system 106.

The central server 108 of the VR system 106 generates the virtual environment for each user 110. The VR system 106 also includes one or more user device systems 112 through which users 110 engage in the virtual reality environment. The central server 108 generates the virtual reality environment specific to each user 110 and wirelessly communicates it to the respective user device 112. Other devices that may be used within the VR system 106 may include, but are not limited to, head-mounted displays (HMDs), wearable computing systems, additional server or cloud-based computing systems, tracking systems (e.g., laser based, camera based, etc.), motion controllers, handheld controllers, and any other such device that aids in user tracking and virtual immersion, as will be recognized by one having ordinary skill in the art with respect to the subject matter presented herein.

The VR system 106 allows users 110 to explore the virtual world by moving through a corresponding physical environment. The atmospheric conditions of the physical environment are monitored by the fire alarm system 104. The fire alarm system 104 may include a variety of detectors 114 such as smoke detectors, carbon monoxide detectors, and heat detectors. Each detector 114 communicates a signal 116 to a fire panel or main control unit 118. In some embodiments, the settings and/or limits for each detector are set through the panel 118. In other embodiments, the settings and/or limits for each detector may also be modified by the operator of the alert system 100 through the processor 102. In select embodiments, the adjustments made by the operator of the alert system 100 through the processor 102 may override the settings and/or limits of the panel 118.

Each detector 114 continually monitors a specific aspect of the atmospheric conditions and an alarm is triggered on the fire panel 118 when the atmospheric condition is in exceedance of the set limit. The fire panel 118 also includes one or more sounder and/or light circuits that cause an alarm device 120 to sound and/or flash, respectively, when the alarm is triggered.

In the embodiment illustrated in FIG. 1, the alert system 100 is in communication with the virtual reality system 106 and the fire alarm system 104 of the physical space. More specifically, the alert system 100 includes a processor 102 that is hardwired to the fire alarm panel 118 of the fire alarm system 104. The processor 102 is also in communication with the central server 108 of the virtual reality system 106. Memory 122 on the processor 102 includes instructions that perform the features and functions described herein. Program instructions may be software or firmware. In one embodiment, the program instructions are stored on the firmware.

In one embodiment, the processor 102 is configured to continuously receive a signal 124 from the fire alarm panel 118 indicating the status of the alarms on the fire panel 118. In some embodiments, the signal 124 may simply indicate that an alarm is triggered or that no alarms have been triggered.

In another embodiment, the processor 102 is configured to continuously monitor the status of the fire alarm panel 118 and receives the signal 124 only when a detector 114 detects an exceedance and triggers an alarm. For example, the panel 118 may include a switch in a closed position when no alarms of the fire panel 118 have been triggered. When a detector 114 detects an exceedance of a limit stored on the panel 118 and an alarm is triggered, the switch on the panel 118 opens and provides the signal 124 to the processor 102. When the processor 102 determines that the switch is open, the processor 102 causes the central server 108 to shut down by disconnecting power thereto.

The signal 124 may include additional information about the alarm(s) that has been triggered. For example, the signal 124 may include the type of atmospheric condition in exceedance, the location of the detector 114 that sensed the exceedance, and/or the level of urgency when an alarm is triggered.

When the signal 124 indicates that an alarm on the fire panel 118 has been triggered, the processor 102 is configured to disconnect the user virtual reality devices 112 from the central server 108 within the virtual reality system 106 by disconnecting power to the central server 108. When the virtual reality devices 112 are disconnected from the central server 108, the virtual reality devices 112 automatically switch to a default message that is stored and contained locally. In this embodiment, the default message is not provided by the central server 108.

In other embodiments, when the signal 124 indicates that an alarm on the fire panel 118 has been triggered, the processor 102 is configured to cause the central server 108 to send a default message to the user virtual reality devices 112.

In some embodiments, a default message appears on the virtual reality devices 112 when the devices 112 are disconnected from the central server 108. The default message may instruct the user 110 to remove the virtual reality device 112 and/or to move towards the nearest exist in the physical space. For example, the virtual reality device 112 may be a head-mounted display (HMD) that responds to the disconnection by showing the default message or warning on the screen of the HUD, by sounding an audible warning through the speakers, or by vibrating the headpiece slightly.

In other embodiments, the processor 102 may be configured to transmit an alert to the user virtual reality devices 112 upon disconnection from the central server 108. The alert may include information about the triggered alarm. For example, the alert may include lights indicating the location of the exceedance and/or the location of the nearest exit.

The default message or alert may be visual, audible, and/or tactile. Visual alerts may be text-based, avatar-based, a combination of both, or other. An example of a tactile alert is a vibration-based alert. For example, a vibration may be provided through a head-mounted display, a backpack, haptic flooring, or any other suitable aspect of the system.

Figure 2:
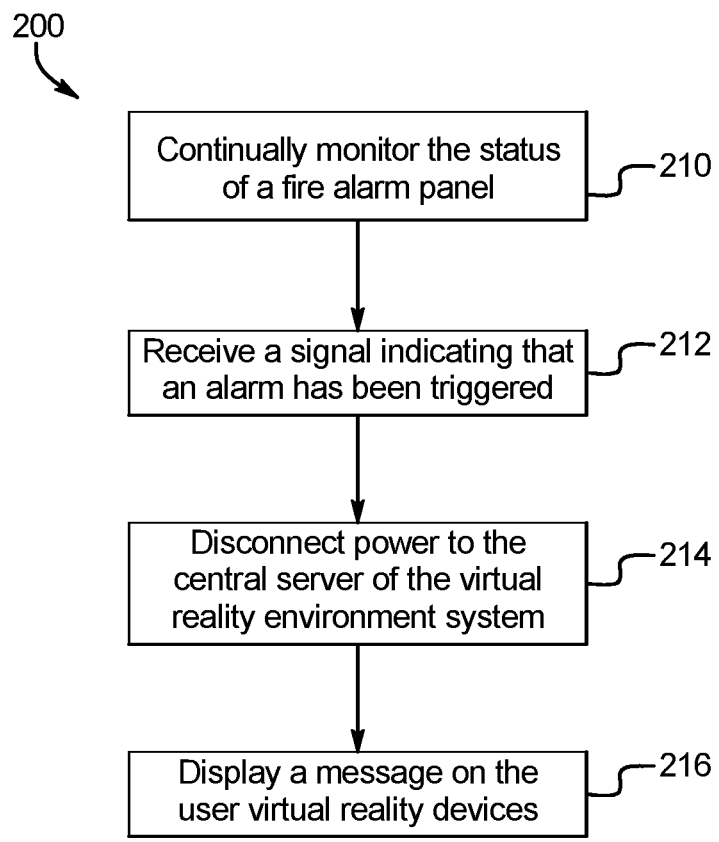
FIG. 2 is flow chart representing an example of a method for assisting users in collision avoidance in virtual reality environments.

FIG. 2 is a flow chart representing an example of a method 200 for alerting users in a virtual reality environment of fire or other danger within the corresponding physical space. For the example method shown in FIG. 2, the fire alert system 100 includes a processor 102 that is hardwired to a fire panel 118 of a fire alarm system 104 and in communication with a central server 108 of a virtual relation system 106.

In Step 210, the processor 102 is configured to monitor the status of the fire alarm panel 118. In one embodiment, the panel 118 includes a switch in a closed position when no alarms of the fire panel 118 have been triggered. When a detector 114 detects an exceedance of a limit stored on the panel 118 and triggers an alarm, the switch on the panel 118 opens, which triggers the signal 124 to be sent to the processor 102.

In Step 212, the processor 102 receives the signal 124 from the fire alarm panel 118 indicating that the switch on the panel 118 is open and an alarm has been triggered.

In other embodiments, the processor 102 is configured to continually receive a signal 124 from the fire alarm panel 118 indicating the status of each detector monitored by the fire alarm system 104 in Step 210. In this embodiment, the signal 124 from the fire alarm panel 118 indicates whether one of the detectors of the fire alarm system 104 has detected an exceedance and triggered an alarm in Step 212.

In both of the embodiments described above, the signal 124 may also indicate additional information about the triggered alarm, such as the level of urgency of the exceedance of the atmospheric condition, the location of the detector that detected the exceedance, and/or the type of atmospheric condition in exceedance.

In Step 214, the processor 102 shuts down the central server 108 by disconnecting power thereto. The user virtual reality devices 112 are disconnected from the central server 108 of the virtual reality system 106 immediately upon receipt of the signal 124 indicating that an alarm has been triggered.

In Step 216, a default message is conveyed to the user through the user virtual reality devices 112 indicating that an alarm has been triggered and instructing the users 110 to remove their user virtual reality devices 112. In some embodiments, the default message is stored locally and is not provided by the central server 108.

In some embodiments, a default message or alert appears on the user virtual reality devices 112. In other embodiments, the user virtual reality devices 112 may also have an audio alarm and/or vibration upon the sounding of an alarm. In still further embodiments, the message includes details about the type of atmospheric condition in exceedance, the location of the detector, and the level of urgency. In still further embodiments, the message includes general directions to the user to the nearest exit.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. An alert system for alerting a user in a virtual reality environment, wherein the virtual reality environment has a corresponding physical environment that is monitored by a detector of a fire alarm system through an alarm panel, and wherein the virtual reality environment is provided to one or more user virtual reality devices by a central server, the alert system comprising:
   a processor in communication with the alarm panel of the fire alarm system and the central server of the virtual reality system; and
   a memory in communication with the processor, the memory storing program instructions that, when executed by the processor, cause the processor to:
      continuously monitor the alarm panel of the fire alarm system;
      receive a signal from the alarm panel when an alarm of the detector has been triggered; and
      disconnect the one or more user virtual reality devices from the central server upon receipt of the signal.

2. The alert system of claim 1, wherein the processor is further configured to disconnect power to the central server upon receipt of the signal.

3. The alert system of claim 1, wherein the detector is one of a fire alarm, a smoke detector, a carbon monoxide detector, and a heat detector.

4. The alert system of claim 1, wherein the detector monitors an atmospheric condition, and wherein the alarm is triggered when the atmospheric condition is in exceedance of a limit on the panel.

5. The alert system of claim 4, wherein the processor is configured to receive a setting for the alarm, wherein the setting includes the limit.

6. The alert system of claim 4, wherein the signal includes a type of the atmospheric condition of the alarm, a location of the detector, or a level of urgency of the alarm.

7. The alert system of claim 1, wherein, upon disconnection to the central server, a message is provided to each user virtual reality device instructing users to move to the closest exit.

8. The alert system of claim 7, wherein the message is variable in intensity corresponding to a level of urgency.

9. The alert system of claim 1, wherein the message includes an audio warning and/or a physical warning to each user virtual reality device.

10. The alert system of claim 9, wherein the audio warning and/or the physical warning are variable in intensity corresponding to a level of urgency.

11. An alert system for alerting a user in a virtual reality environment, the alert system comprising:
- a panel of a fire alarm system configured to monitor a detector;
- one or more user virtual reality devices;
- a central server of the virtual reality system, the central server providing a virtual reality environment to each user virtual reality device;
- a processor in communication with the panel of the fire alarm system and the central server of the virtual reality system; and
- a memory in communication with the processor, the memory storing program instructions that, when executed by the processor, cause the processor to:
  - continuously monitor the alarm panel of the fire alarm system;
  - receive a signal from the alarm panel when an alarm of the detector has been triggered; and
  - disconnect the one or more user virtual reality devices from the central server upon receipt of the signal.

12. The alert system of claim 11, wherein the processor is further configured to disconnect power to the central server upon receipt of the signal.

13. The alert system of claim 11, wherein, upon disconnection to the central server, a message is provided to each user virtual reality device instructing users to move to the closest exit.

14. A method of alerting a user in a virtual reality environment, the method comprising:
- providing, by a central server, a virtual reality environment to one or more user virtual reality devices;
- continuously monitoring, by a detector, an atmospheric condition of a physical environment corresponding to the virtual reality environment;
- continuously monitoring, by a panel of a fire alarm system, the status of the detector;
- continuously monitoring, by a processor, the status of the panel, wherein the signal includes an indication of whether an alarm of the detector has been triggered;
- receiving, by the processor, a signal from the panel indicating that the alarm of the detector has been triggered;
- disconnecting, by the processor, the one or more user virtual reality devices from the central server upon receipt of the signal from the panel.

15. The method of claim 14, further comprising the step of disconnecting, by the processor, power to the central server.

16. The method of claim 14, wherein the signal includes a type of the atmospheric condition of the alarm, a location of the detector, or a level of urgency of the alarm.

* * * * *